(12) United States Patent
Hauer et al.

(10) Patent No.: US 7,970,037 B2
(45) Date of Patent: Jun. 28, 2011

(54) ARRANGEMENT FOR RF POWER DELIVERY TO A GAS DISCHARGE LASER WITH CASCADED TRANSMISSION LINE SECTIONS

(75) Inventors: Frederick W. Hauer, Windsor, CT (US); Patrick T. Tracy, Bolton, CT (US); R. Russel Austin, Cool, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 12/482,341

(22) Filed: Jun. 10, 2009

(65) Prior Publication Data

US 2010/0316084 A1  Dec. 16, 2010

(51) Int. Cl.
*H01S 3/22* (2006.01)

(52) U.S. Cl. ......... 372/55; 372/29.012; 372/56; 372/57; 372/82

(58) Field of Classification Search ............... 372/55–57, 372/29.012
See application file for complete search history.

(56) References Cited

U.S. PATENT DOCUMENTS

| | | |
|---|---|---|
| 4,013,974 A | 3/1977 | Quine |
| 4,311,965 A | 1/1982 | Jones |
| 4,350,958 A | 9/1982 | Pagnamenta |
| 4,774,481 A | 9/1988 | Edwards et al. |
| 4,885,557 A | 12/1989 | Barczys |
| 5,040,184 A | 8/1991 | Murray |
| 5,123,028 A | 6/1992 | Hobart et al. |
| 5,123,128 A | 6/1992 | Hines |
| 5,264,810 A | 11/1993 | Sager et al. |
| 5,311,196 A | 5/1994 | Hanson et al. |
| 5,434,881 A | 7/1995 | Welsch et al. |
| 5,543,751 A | 8/1996 | Stedman et al. |
| 5,602,865 A | 2/1997 | Laakmann |
| 5,712,592 A | 1/1998 | Stimson et al. |
| 6,018,280 A | 1/2000 | Makanvand |
| 6,097,267 A | 8/2000 | Hampel |
| 6,323,742 B1 | 11/2001 | Ke |
| 6,384,540 B1 | 5/2002 | Porter, Jr. et al. |
| 6,489,859 B1 | 12/2002 | Tahara et al. |
| 6,778,037 B1 | 8/2004 | Salmela et al. |
| 6,788,722 B1 | 9/2004 | Kennedy et al. |
| 6,999,490 B2 | 2/2006 | Kennedy et al. |
| 7,164,903 B1 | 1/2007 | Cliff et al. |
| 7,233,217 B2 | 6/2007 | Phillips et al. |
| 2006/0192615 A1 | 8/2006 | Fraysse |
| 2007/0279035 A1 | 12/2007 | Robotham et al. |
| 2008/0204134 A1 | 8/2008 | Knickerbocker et al. |
| 2009/0004918 A1* | 1/2009 | Papanide et al. ......... 439/620.03 |

OTHER PUBLICATIONS

Liao, S. Y. (1987). "Balanced Amplifier Design and Power-Combining Techniques" Chapter 5 In *Microwave Circuit Analysis and Amplifier Design*. Prentice-Hall, Inc.: Englewood Cliffs, New Jersey, pp. 161-192.

Wilkinson, E. J. (Jan. 1960). "An N-Way Hybrid Divider," *IEEE Transactions on Microwave Theory and Techniques*, pp. 116-118.

Bramham, P., "A Convenient Transformer for Matching Co-Axial Lines", CERN European Organization for Nuclear Research, Proton Synchrotron Division, Linac Group Nov. 1959, 18 pages.

(Continued)

*Primary Examiner* — Dung T Nguyen

(74) *Attorney, Agent, or Firm* — Morrison & Foerster LLP

(57) ABSTRACT

RF power is transmitted to a $CO_2$ gas discharge laser form a source of RF power via a series combination of transmission line sections. The lengths and characteristic impedances of the transmission line sections are selected to transform the impedance of the RF power source to the operating impedance of the laser.

15 Claims, 10 Drawing Sheets

OTHER PUBLICATIONS

Emerson, Darrel, "The Twelfth-Wave Matching Transformer", document retrieved on Nov. 12, 2010, Available at: http://www.tuc.nrao.edu/~demerson/twelfth/twelfth.htm.

McDonald, Kirk T., "Impedance Matching of Transmission Lines", Joseph Henry Laboratories, Princeton University, Princeton, NJ 08544, Jul. 20, 2005, pp. 1-22.

Invitation to Pay Additional Fees and Partial International Search Report received for PCT Patent Application No. PCT/US2010/037910, mailed on Oct. 8, 2010, 5 pages.

Regier, Frank A., "Impedance Matching with a Series Transmission Line Section", Proceedings of the IEEE Jul. 1971, pp. 1133-1134.

International Preliminary Report on Patentability received for PCT Patent Application No. PCT/US2008/00908, issued on Sep. 1, 2009, 6 pages.

International Search Report received for PCT Patent Application No. PCT/US2008/00908, mailed on Jun. 26, 2008, 3 pages.

International Search Report and Written Opinion received for PCT Patent Application No. PCT/US2010/037910, mailed on Mar. 22, 2011, 18 pages.

* cited by examiner

ARRANGEMENT FOR RF POWER DELIVERY TO A GAS DISCHARGE LASER WITH CASCADED TRANSMISSION LINE SECTIONS

TECHNICAL FIELD OF THE INVENTION

The present invention relates in general to radio frequency (RF) power supplies. The invention relates in particular to RF power supplies for driving carbon dioxide ($CO_2$) slab lasers.

DISCUSSION OF BACKGROUND ART

FIG. 1A is a block diagram schematically illustrating a prior-art arrangement 10 for driving a $CO_2$ (gas discharge) slab laser. Power amplifier 12 represents an output power amplifier stage of an RF power supply for driving the laser. The output impedance of such a power amplifier is typically 50 Ohms. The amplifier output is typically at frequencies up to about 150 megahertz (MHz) or greater. Such an amplifier stage can include a number of parallel combined transistor amplifier modules. The amplifier output is connected to electrodes (not shown) of a $CO_2$ laser 18 via a 50 Ohm coaxial transmission cable (line) 14 and an impedance matching network 16. The transmission line can be considered as having an input port or node 13 and an exit port (or node) 15.

Cable 14 can be of any length and, accordingly, the power supply can be located remote from the laser. The impedance at entrance port 13 of the transmission line is essentially the same as an exit port 15 of the transmission line and is the same as the load impedance of the RF amplifier. The impedance of a $CO_2$ laser scales inversely in relation to the power output of the laser. Accordingly as power output increases, the impedance of the amplifier must be matched to increasingly lower impedance at the laser, and the size, weight and cost of the impedance matching network increases accordingly.

Recent slab laser designs have included an RF power supply mounted directly on the laser such that a long transmission cable is not required. FIG. 1B schematically illustrates a prior-art arrangement 20 applicable with a directly mounted power supply. Here the RF power supply is connected by a transmission cable 22 having a length of one-quarter wavelength at a frequency typically between about 80 MHz and 100 MHz, directly to the $CO_2$ laser. That length would be about 45 centimeters (cm) for a frequency of 100 MHz. In this example of FIG. 1B it is assumed that laser has an impedance of 4 Ohms which is about the impedance for a laser having an output between about 800 W and 1000 W. Transmission line 22 is assumed to have an impedance equal to the square root of the product 50×4 Ohms, i.e., about 14 Ohms. The impedance at entrance port 21 of the transmission line is 50 Ohms and the impedance at exit port 23 is 4 Ohms. In an arrangement such as the arrangement of FIG. 1B, if coaxial cable having a desired characteristic impedance is not commercially available, it will usually be possible to find cable having a sufficiently close match that a relatively simple inexpensive impedance matching network can be used to match the difference.

A disadvantage of the arrangement of FIG. 1B is that quarter-wave transmission line 22 is a resonant structure at a single frequency. A $CO_2$ slab laser has a resonant frequency when the discharge of the laser is not lit (laser not operating) that is higher than the resonant frequency once the discharge is lit and the laser is lasing (operating). The operating resonant frequency can be as much as 25% or more lower than the non-operating frequency for a 1 KW laser. This makes it difficult, if not impossible, with the arrangement of FIG. 1B to apply the same power efficiently to the laser in both the un-lit and lit conditions.

Another disadvantage of the arrangement of FIG. 1B is that low impedance cables, for example cable having an impedance of less than 25 Ohms, are difficult to obtain commercially without a special order. Cables having an impedance of 50 or 75 Ohms are readily available and relatively inexpensive by comparison.

As laser power increases, and accordingly as RF power delivered to the laser increases (RF power is typically about ten-times greater than laser output power), both of the above described arrangements will encounter a problem with heating of the single transmission line along which the power is delivered. This will be true whether the transmission line is coaxial, a micro-strip line, or any other form of transmission line. This problem has been solved in the prior-art by an arrangement similar to that depicted in FIG. 2.

Here, a $CO_2$ laser arrangement 24 includes a plurality of power amplifiers 12 (three in this example) delivering RF power via a corresponding plurality of 50-Ohm transmission lines 14. The output conductors of the lines are connected together and connected via an impedance matching network 16 to a $CO_2$ laser 18. The three transmission lines can have the same (as illustrated) or different lengths. The impedance at each entrance port 13 is 50 Ohms and there is an impedance of 16.6 Ohms at a common output port 17 which is connected to the impedance matching network. This reduces demands on the design of the impedance matching network.

A problem with the arrangement of FIG. 2, encountered when driving a 1 kW laser, was that in order to effectively light the laser discharge it was necessary to make the transmission lines one half-wavelength long. This resulted in a bandwidth limitation similar to that described above with reference to FIG. 1B, which meant that power could not be delivered with maximum efficiency at both the un-lit and lit discharge frequencies. There is a need for an RF-power delivery arrangement for a $CO_2$ laser than preferably does not require an impedance matching network, and has a sufficiently broad bandwidth that power can be delivered efficiently at both the un-lit and lit discharge frequencies of the laser.

Additional information about RF power supplies for gas lasers can be found in commonly owned U.S. Patent Publication 2008/0204134, the disclosure of which is incorporated herein by reference.

SUMMARY OF THE INVENTION

The present invention is directed to apparatus for coupling RF power to a $CO_2$ gas discharge laser. In one aspect the inventive apparatus comprises a gas discharge laser having an operating impedance in an operating condition at an operating resonant frequency when a gas discharge in the laser is lit. At least one source of radio frequency (RF) power is provided for powering the gas discharge. The RF power source has a source impedance, which is greater than the operating impedance of the laser. At least one plurality of transmission line sections is connected in series in an electrically conductive path between the RF power source and the laser. At least first and second ones of the transmission line sections have respectively first and second different characteristic impedances. The length and characteristic impedance of each of the transmission line sections is selected to transform the source impedance to a third impedance lower than the source impedance for optimizing RF power transmission from the RF power source to the gas discharge laser.

In preferred embodiments of the invention the transmission line lengths and characteristic impedances are selected such that RF power transmission is optimized over a frequency range broad enough to include the operating resonant frequency and the non-operating (unlit discharge) resonant frequency of the laser. Arrangements with a bandwidth of a frequency octave or greater are described. All embodiments can be configured such that an L-C matching network is not required.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
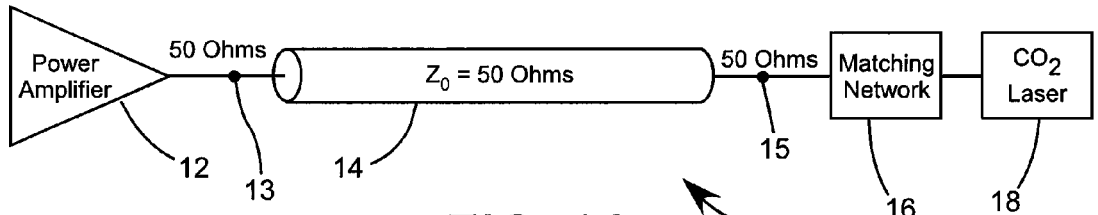
FIG. 1A schematically illustrates one prior-art arrangement for delivering RF power from an RF Amplifier to a $CO_2$ laser via a single length of transmission line of arbitrary length and an L-C impedance matching network.

Continuing with reference to the drawings, wherein like components are designated by like reference numerals, FIG.

3 schematically illustrates one preferred embodiment 30 of an RF-power delivery arrangement in accordance with the present invention. In arrangement 30 the output of a single power amplifier stage 12 having an output impedance of 50 Ohms is transmitted by a first transmission line section 32 having a characteristic impedance of 26 Ohms in series with a second transmission line 34 having a characteristic impedance of 7.5 Ohms, to match a 4-Ohm operating impedance of laser 18. By way of example the amplifier stage can have an output power of about 1.5 kW and operate at a frequency of about 100 MHz.

Transmission lines 32 and 34 each have a transmission length of one-quarter wavelength at a frequency about midway between the lit discharge (operating) frequency and the unlit (non-operating) discharge resonant frequency. It should be noted here that the transmission line section length, as recited here and in the appended claims refers to the effective electrical or RF transmission length of the section. The actual physical length will be shorter to an extent determined by the dielectric constant and the thickness of the insulating material separating conductors of the transmission line section. The impedance at port 31 is 50 Ohms. This is transformed to an "image" impedance of 14 Ohms at port 33 (the exit port of transmission line 32 and the entrance port of transmission line 34). This image impedance is transformed to another image impedance of 4 Ohms at exit port 35 of transmission line, matching the impedance of the $CO_2$ laser.

Transmission line 32 is preferably a flexible coaxial transmission cable. Such a cable is commercially available from Weico Wire and Cable, Inc. of Edgewood, N.Y. Transmission line 34 is a 7.5 Ohm transmission line. Such a transmission line may not be available as an "off-the-shelf" item but it can be commercially purchased by special order, for example from Micro-COAX Inc. of Pottstown, Pa. While depicted in coaxial form in FIG. 3, for convenience of illustration, it is preferred that transmission line 34 is fabricated as a quarter-wave, micro-strip transmission line printed on an alumina substrate. Transmission line 32 can also be constructed in this form. Other forms of transmission lines such as strip-lines or parallel pair lines may be used in this and any other embodiment of the invention described herein without departing from the sprit and scope of the invention. The construction of different forms of transmission line is well known by those skilled in the RF art and a description thereof is not required for understanding principles of the present invention. Accordingly, no such description is presented herein.

Figure 1B:
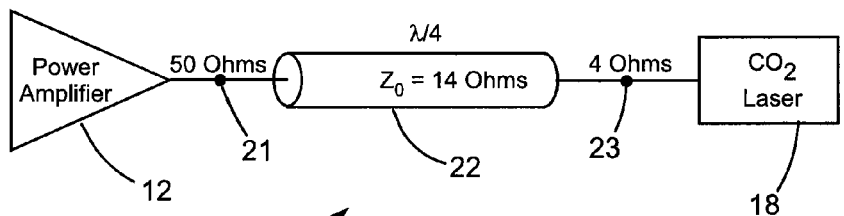
FIG. 1B schematically illustrates another prior-art arrangement for delivering RF power from an RF Amplifier to a $CO_2$ laser via a single length of transmission line of having a length of one quarter-wavelength at the frequency of the RF power, without the L-C impedance matching network.
Figure 2:
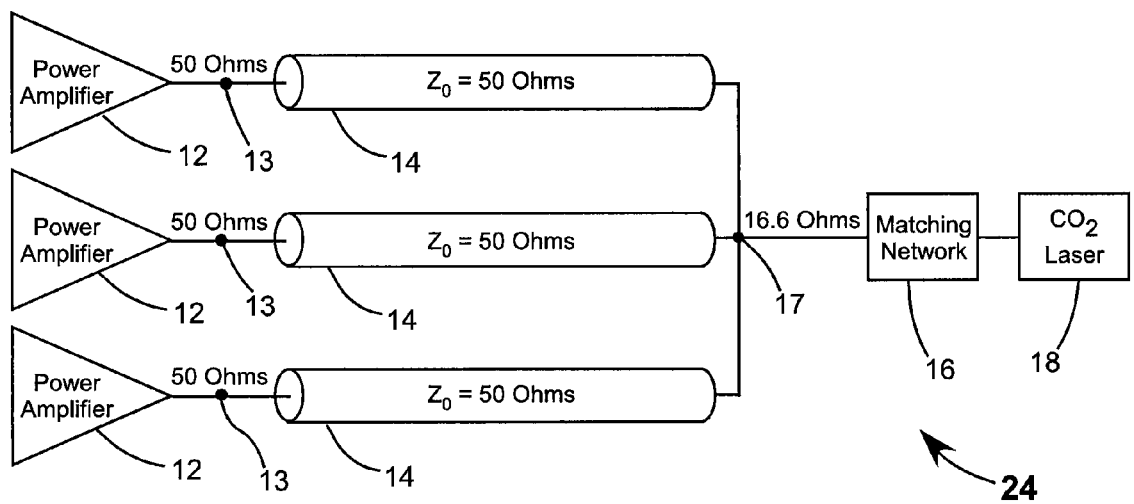
FIG. 2 schematically illustrates a prior-art arrangement for delivering RF power from three RF amplifiers via three transmission lines of arbitrary length and one L-C impedance matching network to one $CO_2$ laser.
Figure 3:
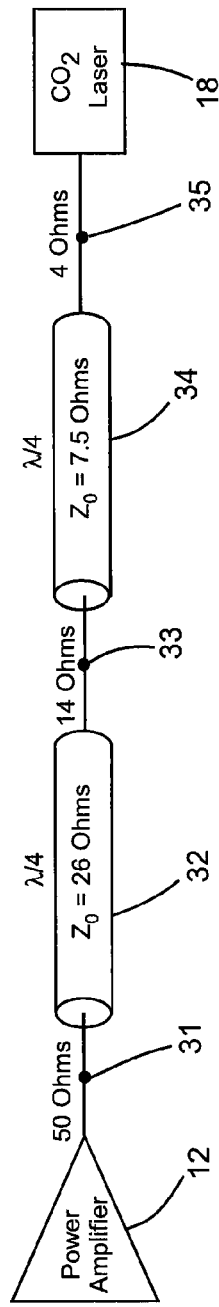
FIG. 3 schematically illustrates one preferred embodiment of apparatus in accordance with the present invention for delivering power from an RF amplifier to a $CO_2$ laser via a series arrangement of two transmission line-sections each thereof having a length of one-quarter wavelength for a predetermined operating frequency and having different characteristic impedances between the output impedance of the RF amplifier and a lit-discharge impedance of the $CO_2$ laser.
Figure 5:
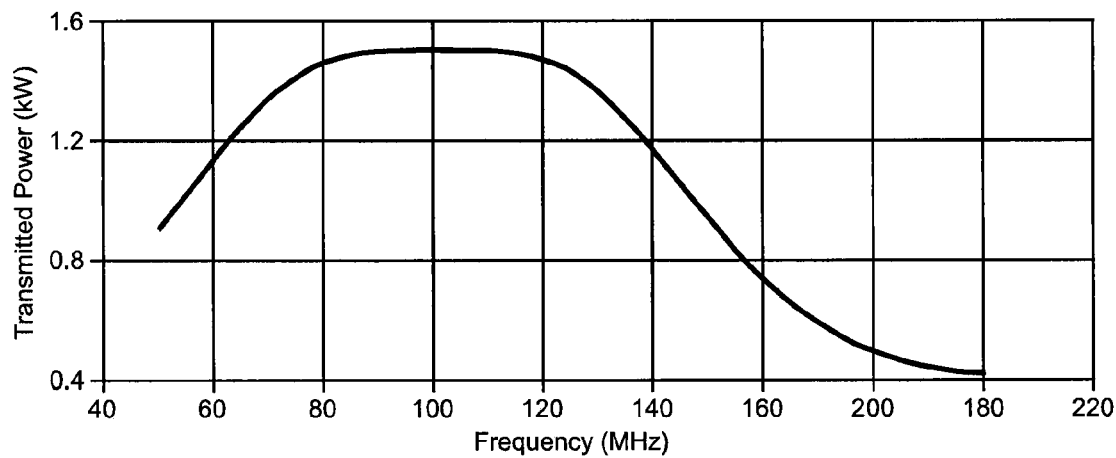
FIG. 5 is a graph schematically illustrating calculated power transmission as a function of frequency for one example of the transmission-line section arrangement of FIG. 3.
Figure 7:
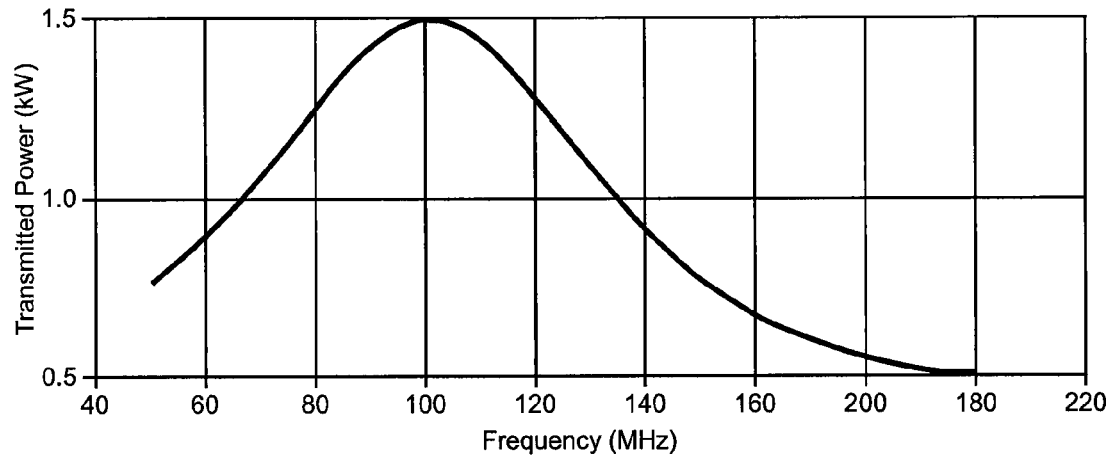
FIG. 7 is a graph schematically illustrating calculated power transmission as a function of frequency for one example of the prior-art arrangement of FIG. 2.

FIG. 5 is a graph schematically illustrating the calculated power transmission as a function of frequency for the example of FIG. 3, wherein the quarter-wave transmission-lines 32 and 34 are one-quarter wavelength long for a frequency of 100 MHz. The 0.15 dB bandwidth is about ±20 MHz. This is sufficient bandwidth to accommodate the above discussed 25% difference between un-lit discharge and lit discharge resonant frequencies. By way of comparison, calculated power transmission as a function of frequency for the prior-art example of FIG. 1B is schematically depicted in FIG. 7. This has a calculated 0.15 dB Bandwidth of only ±8 MHz which is less than 25% of the center frequency of 100 MHz.

Figure 4:
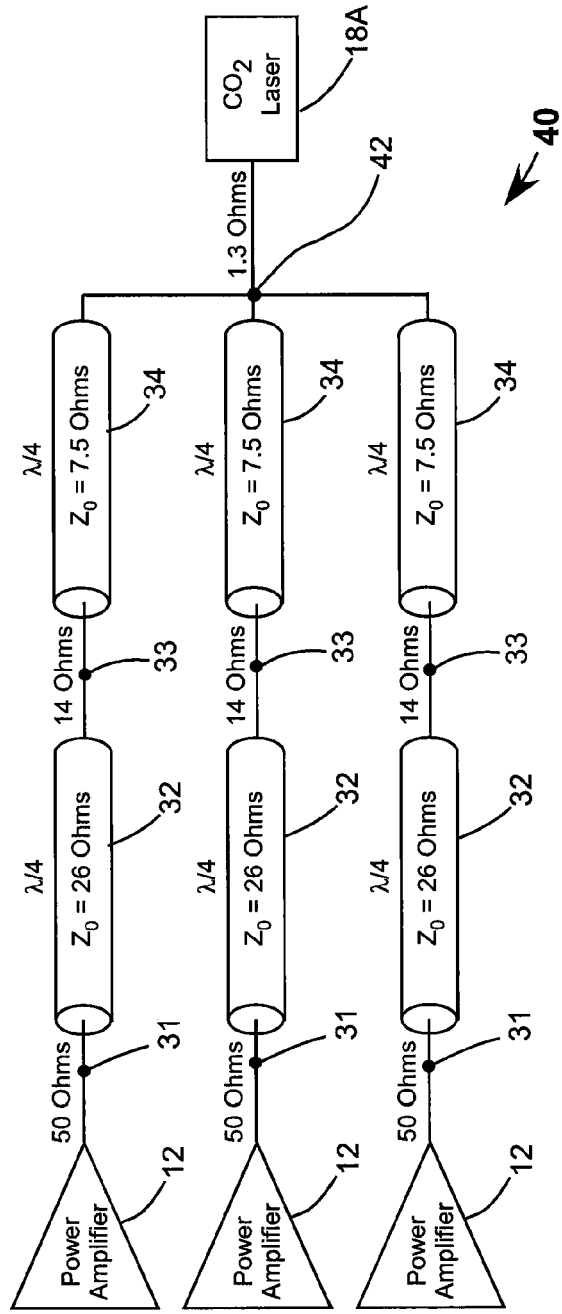
FIG. 4 schematically illustrates another preferred embodiment of apparatus in accordance with the present invention for delivering power from three RF amplifiers to a $CO_2$ laser via three arrangements similar to the arrangement of FIG. 3.

FIG. 4 schematically depicts another preferred embodiment 40 of an RF-power delivery arrangement in accordance with the present invention. In arrangement 40, the output of three power amplifier stages 12, each thereof having an output impedance of 50 Ohms, is transmitted by three corresponding pairs 32 and 34 of transmission line sections each having the lengths and impedance values of transmission line sections 32 and 34 of FIG. 3 to a CO2 laser 18A having an input impedance of 1.3 Ohms. The output of the three transmission line sections 34 is connected to a common node 42 at which the impedance is 1.3 Ohms, i.e., is the impedance of the parallel combination of three 4-Ohm output impedances of the three transmission-line section pairs.

Figure 6:
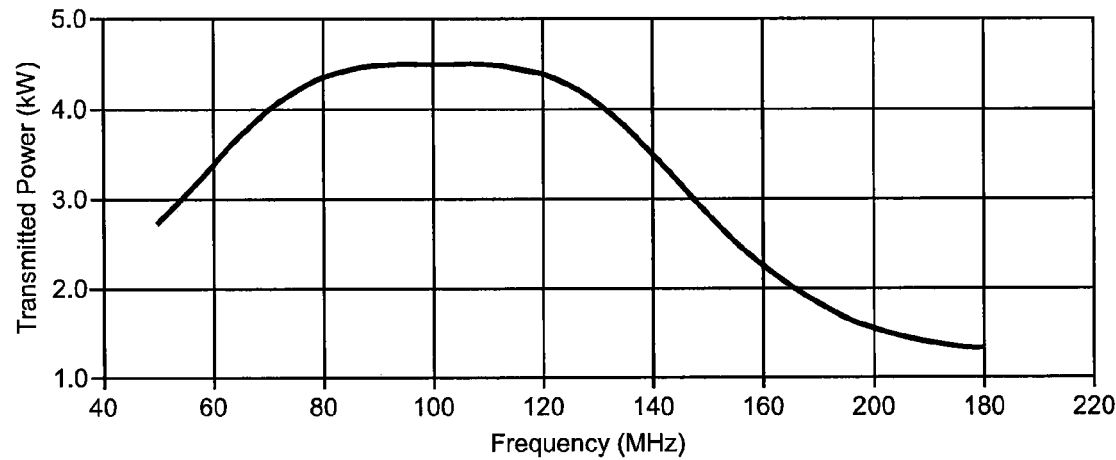
FIG. 6 is a graph schematically illustrating calculated power transmission as a function of frequency for one example of the arrangement of FIG. 4.

The calculated power transmission as a function of frequency of arrangement 40 is depicted in FIG. 6. It can be seen that this is substantially the same as for arrangement 30 of FIG. 3 with a 0.15 dB bandwidth of ≅20 MHz It should be noted here that while three transmission line section series are parallel connected in the arrangement 30, this should not be considered limiting and is just a specific example of a general, N-way, combination, where N is two or more. Further, in arrangement 30 the combination of transmissions line sections 34 could be arranged as a classical Wilkinson N-way combiner with "balancing" resistors in a star or delta connection with nodes 33. Such balancing resistors can improve port-to-port isolation should that be required because of phase or magnitude imbalance between power amplifiers 12.

Figure 8:
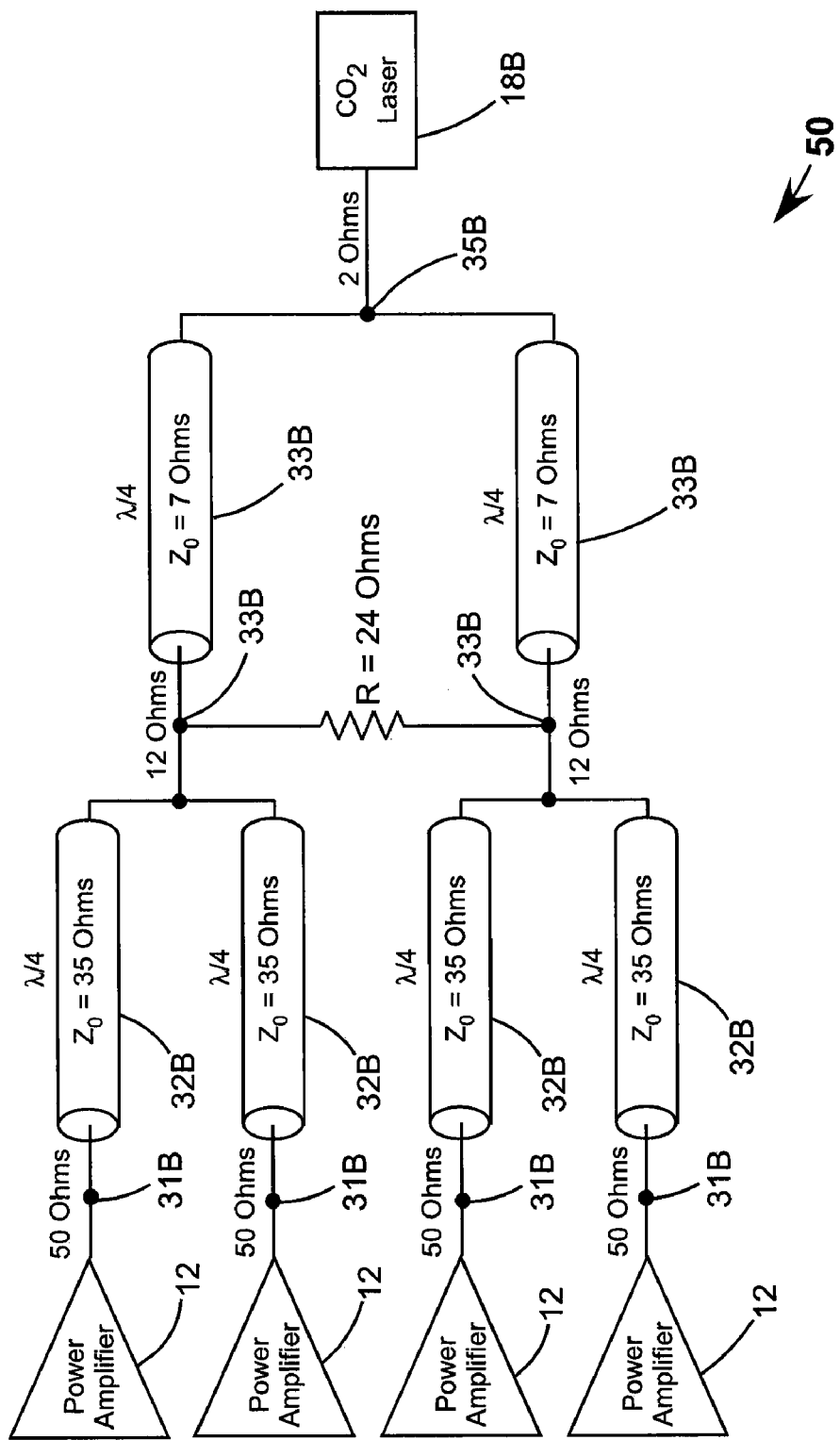
FIG. 8 schematically illustrates yet another preferred embodiment of apparatus in accordance with the present invention for delivering power from four RF amplifiers to a $CO_2$ laser via a corresponding four quarter-wavelength-long transmission-line sections having a first characteristic impedance connected in pairs to two quarter-wavelength-long transmission-line sections having a second characteristic impedance different from the first characteristic impedance.

FIG. 8 schematically illustrates yet another preferred embodiment 50 of a power delivery arrangement in accordance with the present invention. In this example, a Wilkinson N-Way combination with balancing resistors is used in a binary form, with a balance resistor to provide isolation between pairs of amplifiers. In arrangement 50 there are four RF amplifiers 12, the combined power of which is delivered to a $CO_2$ laser 18B having a lit-discharge impedance of 2 Ohms.

Each RF amplifier 12 is connected to a quarter-wave length 32B of transmission line sections, here, having an impedance of 35 Ohms. At input port 31B of the transmission line sections the impedance is the output impedance of the RF amplifiers, here, assumed to be 50 Ohms for each amplifier. The outputs of pairs of transmission line sections 32B are connected together such that at a common output port 33B the impedance is 12 Ohms, which is the value of two 24-Ohm individual impedances in parallel. Ports 33B are connected by an isolating (balancing) resistor R having a resistance equal to twice the 12-Ohm impedances at ports 33B. The two common ports 33B function as input ports to a corresponding two quarter-wave lengths of transmission line 34B each thereof having an impedance of 7 Ohms connected to a common output port 35B. The impedance at the common output is 2 Ohms which is the value of two 4-Ohm individual impedances in parallel, and matches the 2-Ohm (lit discharge) impedance of the laser.

It can be seen that in the electrical-conduction path between any RF amplifier 12 and laser 18B there is only one transmission line length 32B and only one transmission line length 33B. The transmission as a function of frequency can be expected to be similar to that (depicted in FIG. 5) of arrangement 30 of FIG. 3 as it is determined primarily by the length and impedance of the transmission line sections series-connected in the conduction path. Those skilled in the art may select other combinations of RF amplifiers and transmission lines which provide this condition without departing from the spirit and scope of the present invention. By way of example, there may be six RF amplifiers 12 and lines 32B connected in groups of three to two transmission lines 34B. In any combination, the use of a balancing resistor or resistors, such as balancing resistor R of FIG. 8, is optional.

Figure 8A:
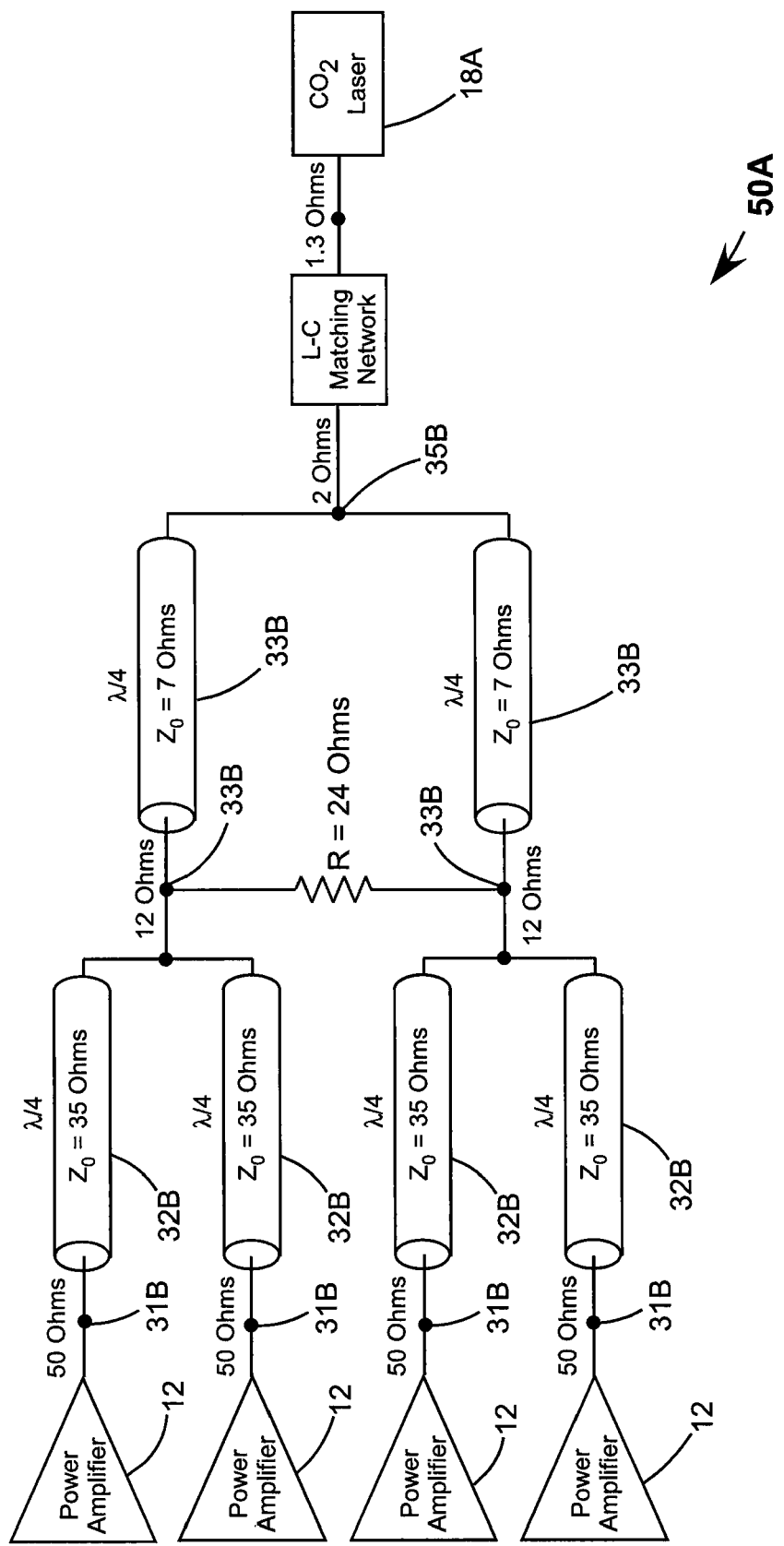
FIG. 8A schematically illustrates an additional embodiment of apparatus in accordance with the present invention for delivering power from four RF amplifiers to a $CO_2$ laser, similar to the apparatus of FIG. 8 but wherein there is an L-C matching network connected between the second characteristic transmission line sections and the $CO_2$ laser.

FIG. 8A depicts an additional embodiment 50A of a power-delivery arrangement in accordance with the present invention. The arrangement of 50A is similar to arrangement 50 of FIG. 8 with an exception that laser 18B of arrangement 50 is replaced by a laser 18A having an impedance of 1.3 Ohms. A conventional L-C impedance matching network 39 is connected between transmission line sections 34B of the arrangement to transform the 2-Ohm image impedance at node 35B to the 1.3 Ohm operating impedance of the laser. Preferably the L-C matching network is designed to have a bandwidth comparable to that of the transmission line arrangement.

Figure 9:
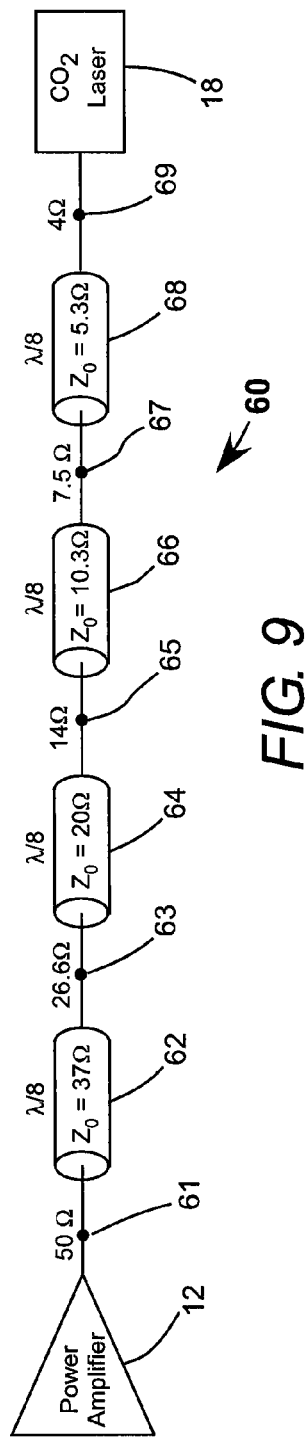
FIG. 9 schematically illustrates yet another preferred embodiment of apparatus in accordance with the present invention for delivering power from an RF amplifier to a $CO_2$ laser via a series arrangement of four transmission line-sections each thereof having a length of one-eighth wavelength for a predetermined operating frequency and having different characteristic impedances between the output impedance of the RF amplifier and a lit-discharge impedance of the $CO_2$ laser.

FIG. 9 schematically illustrates still another preferred embodiment 60 of a power delivery arrangement in accordance with the present invention. This arrangement delivers power from a single RF amplifier 12, here, having an output impedance of 50 Ohms (at port 61) to a $CO_2$ laser 18 (at port 69) having a lit-discharge impedance of 4 Ohms. The power is delivered via a series chain of four eighth-wave lengths (sections) of transmission line 62, 64, 66, and 68 having characteristic impedances of 37 Ohms, 20 Ohms, 10.3 Ohms, and 5.4 Ohms, respectively. At intermediate ports 63, 65, and 67, the impedances are 26.6 Ohms, 14 Ohms, and 7.5 Ohms, respectively.

Figure 10:
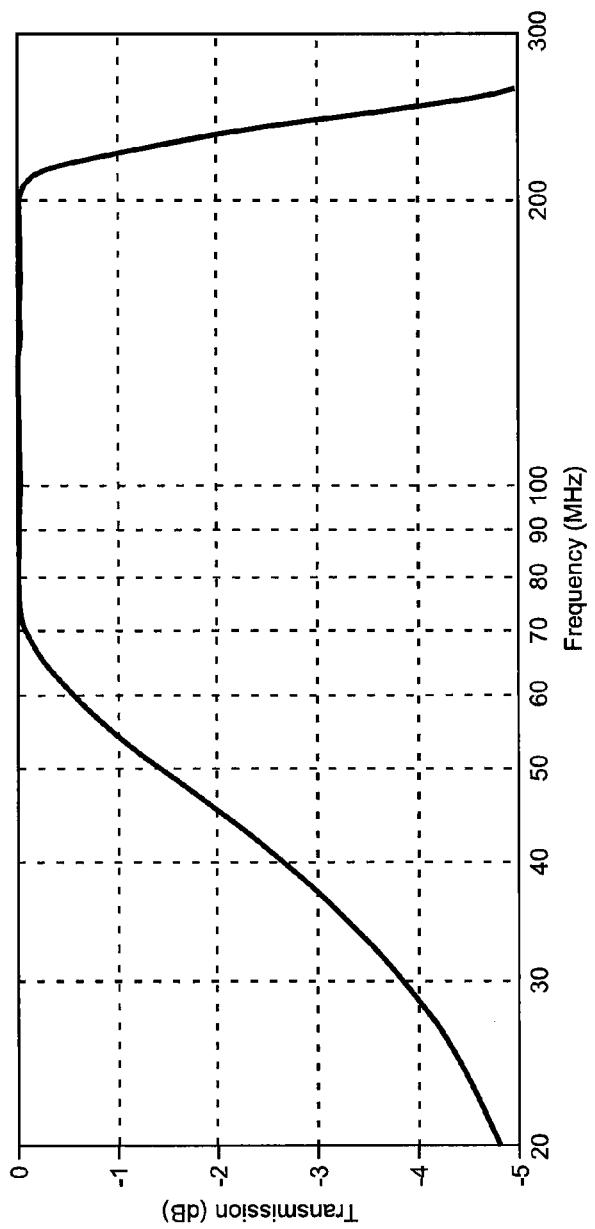
FIG. 10 is a graph schematically illustrating calculated power transmission as a function of frequency for one example of the transmission-line section arrangement of FIG. 9.

FIG. 10 is a graph schematically illustrating calculated transmission (in decibels) for the arrangement of FIG. 9, with impedance values as noted, assuming a center frequency (the frequency at which the transmission line sections are one-eighth of a wavelength long) of 70 MHz. It can be seen that the 0.15 dB bandwidth extends from this center frequency to a frequency of about 200 MHz, which is a bandwidth of almost two octaves.

Figure 11:
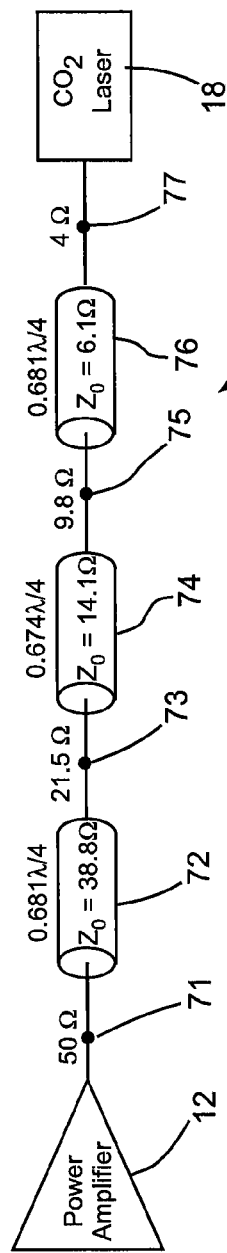
FIG. 11 schematically illustrates still another preferred embodiment of apparatus in accordance with the present invention for delivering power from an RF amplifier to a $CO_2$ laser via a series arrangement of three transmission line-sections each thereof having a length of about two-thirds of a quarter-wavelength for a predetermined operating frequency and having different characteristic impedances between the output impedance of the RF amplifier and a lit-discharge impedance of the $CO_2$ laser.

FIG. 11 schematically illustrates still yet another preferred embodiment 71 of a power delivery arrangement in accordance with the present invention. This arrangement again delivers power from a single RF amplifier 12 having an output impedance of 50 Ohms (at port 71) to a $CO_2$ laser 18 (at port 77) having a lit-discharge impedance of 4 Ohms. The power is delivered via a series-chain of three sections of transmission line 72, 74, and 76 each having a length of about, but not exactly, one-sixth of a wavelength, and having characteristic impedances of 32.82 Ohms, 14.14 Ohms, and 6.093 Ohms, respectively. At intermediate ports 73, and 75, the image impedances are 21.54 Ohms, and 9.28 Ohms, respectively. Note that the line impedances are rounded in FIG. 11 for convenience of illustration. The line lengths are varied slightly from the one-sixth wavelength to provide a flatter in-band spectral response and are preferably 0.681, 0.674, and 0.681 quarter-wavelengths respectively.

Figure 12:
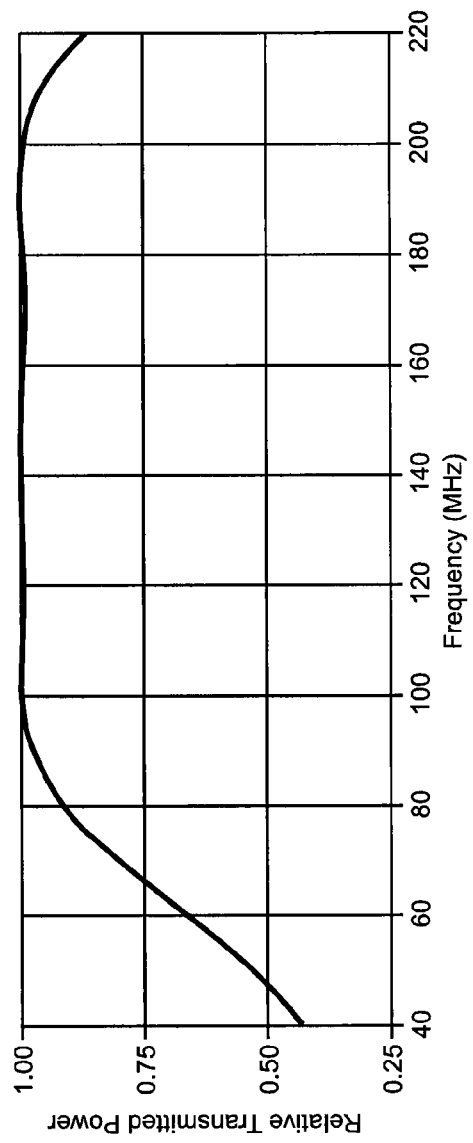
FIG. 12 is a graph schematically illustrating calculated relative power transmission as a function of frequency for one example of the transmission-line section arrangement of FIG. 11.

FIG. 12 is a graph schematically illustrating calculated relative transmission for the arrangement of FIG. 11, with impedance values and line-lengths as noted above, assuming a center frequency of 100 MHz. It can be seen that the bandwidth extends from this center frequency to a frequency of about 200 MHz, which is a bandwidth of about one octaves.

It should be noted that with arrangements of the type exemplified in FIGS. 9 and 11, the center frequency for specifying transmission length is preferably selected to correspond to the lit discharge frequency or some somewhat-lower frequency. The bandwidth will be more than sufficient to accommodate the unlit discharge frequency.

In the above-described inventive arrangements exemplary impedance values for transmission lines are selected for a particularly preferred performance, as lines having specific impedances can be commercially obtained on special order as noted above. Special order lines, of course, can be expected to be more expensive than stock lines to an extent depending on the quantity required. In the above-described arrangements, the particularly preferred values of line-impedance are between the output impedance of the RF amplifier and the operating impedance of the laser. In the above-described arrangements the total length of transmission lines is about one-half of a wavelength at an assumed center frequency. Set forth below is a description of how line-length can be used as a variable to accommodate at least one transmission line section that has an impedance value available from stock and can even have a value higher than the output impedance of the amplifier.

Figure 13:
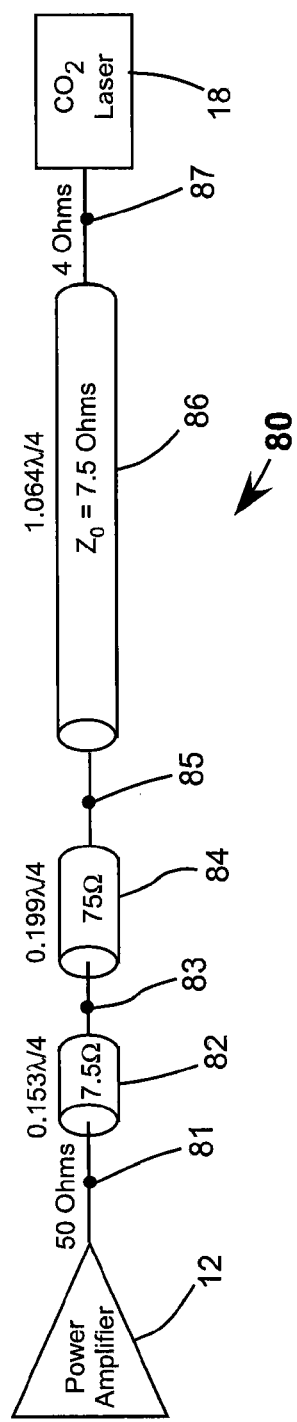
FIG. 13 schematically illustrates a further preferred embodiment of apparatus in accordance with the present invention for delivering power from an RF amplifier to a $CO_2$ laser via a series arrangement of three transmission line-sections each thereof having a different length with two thereof having a first impedance between the output impedance of the RF amplifier and a lit-discharge impedance of the $CO_2$ laser and one thereof having a second impedance higher than both the output impedance of the RF amplifier and the lit-discharge impedance of the $CO_2$ laser.

FIG. 13 schematically illustrates a further preferred embodiment 80 of a power delivery arrangement in accordance with the present invention. This arrangement, once again, delivers power from a single RF amplifier 12 having an output impedance of 50 Ohms (at port 81) to a $CO_2$ laser 18 (at port 87) having a lit-discharge impedance of 4 Ohms. The power is delivered via a series-chain of three sections of transmission line 82, 84, and 86, having different lengths. Section 82 has a length of 0.1527 of a quarter-wavelength; section 84 has a length of 0.1985 of a quarter-wavelength; and section 86 has a length of 1.0639 quarter-wavelengths. The total length of transmission line sections is about three-eights of a wavelength. The center frequency for establishing the line-length wavelength is preferably about mid-way between the lit discharge frequency and the unlit discharge frequency.

The characteristic impedances of sections 82, 84, and 86 are 7.5 Ohms, 75.0 Ohms (higher than the amplifier output impedance), and 7.5 Ohms, respectively. Coaxial cable having an impedance of 75.0 Ohms is readily available commercially. The image impedance values at ports 83 and 85 are not calculated and knowledge thereof is not necessary for reproducing this example of the invention.

Figure 14:
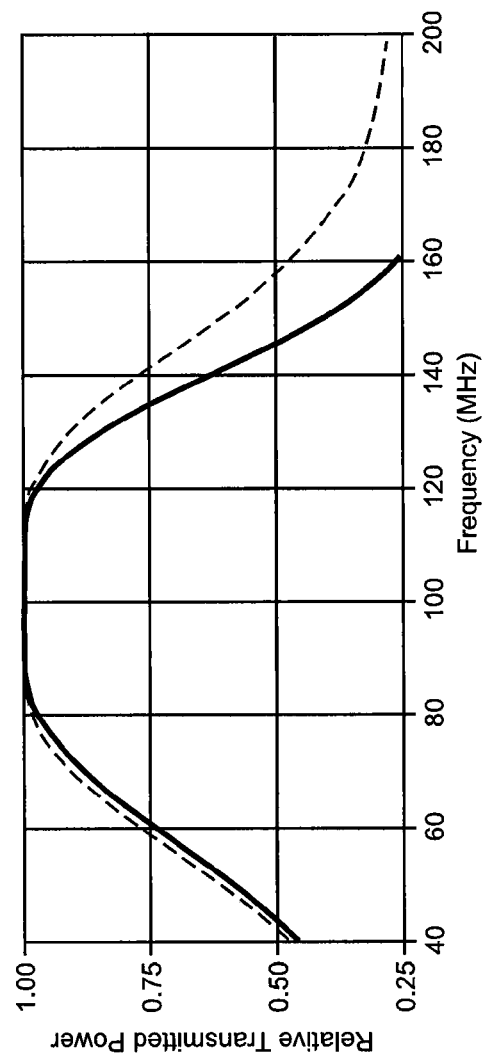
FIG. 14 is a graph schematically illustrating calculated relative power transmission as a function of frequency for one example of the transmission-line section arrangement of FIG. 13.

FIG. 14 is a graph schematically illustrating relative transmission for the arrangement of FIG. 13 (bold solid curve), with impedance values and line-lengths as noted above, assuming a center frequency of 100 MHz. The spectral response of the above described example of FIG. 3 is depicted by a fine dashed curve. The 0.12 dB bandwidth of arrangement 80 is comparable to that of arrangement 30 of FIG. 3.

Figure 15:
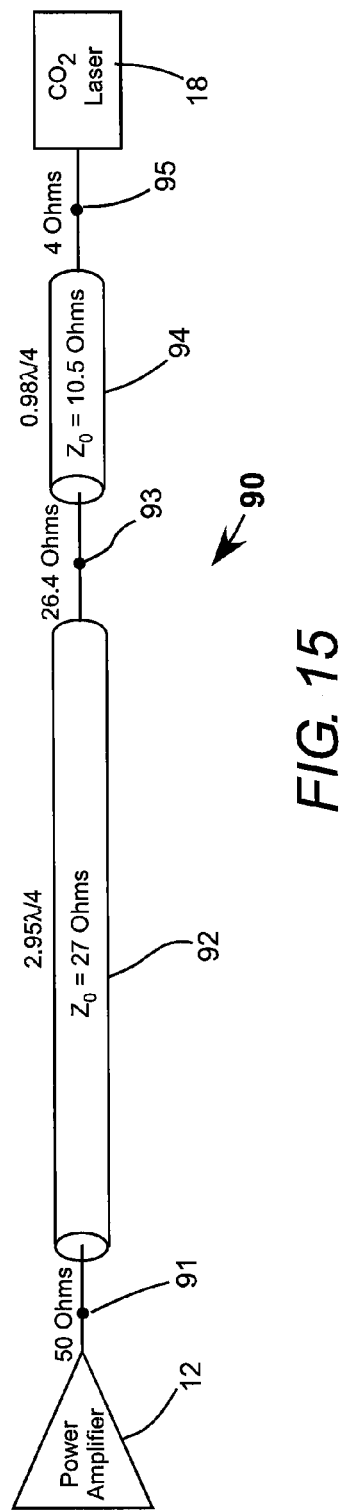
FIG. 15 schematically illustrates another further preferred embodiment of apparatus in accordance with the present invention for delivering power from an RF amplifier to a $CO_2$ laser via a series arrangement of two transmission-line sections one thereof having a length of about three quarter-wavelengths at a predetermined frequency and the other having a length of about one-quarter wavelength at the predetermined frequency with the transmission line sections having different characteristic impedances between the output impedance of the RF amplifier and a lit-discharge impedance of the $CO_2$ laser.

FIG. 15 schematically illustrates a another further preferred embodiment 90 of a power delivery arrangement in accordance with the present invention, configured for delivering power from a single RF amplifier 12 having an output impedance of 50 Ohms (at port 91) to a $CO_2$ laser 18 (at port 95) having a lit-discharge impedance of 4 Ohms, as in other above-described arrangements. The power is delivered via a series chain of two sections of transmission line 92 and 94. Section 92 has a length of 2.95 quarter-wavelengths and section 94 has a length of 0.98 of a quarter-wavelength. Here the total length of transmission lines is about two half-wavelengths. The wavelength here preferably corresponds to a center-frequency about mid-way between the lit-discharge frequency and the unlit-discharge frequency.

To alleviate a need for specific values of impedance for the sections the arrangement is configured to provide peak transmission at and about two particular frequencies, here, 87.5 MHz and 112.5 MHz, without regard to transmission in between these frequencies. These frequencies are examples of lit and unlit-discharge frequencies of a laser such as laser 18. Sections 92 and 94 have characteristic impedances of 27 Ohms and 10.5 Ohms respectively. These values are very close to those of cables TC-24 and T-12, respectively available from stock from RF Power Systems Inc, of Peoria, Ariz. The lengths are for a nominal center frequency of 100 MHz. The image impedance at port 93 is a purely resistive 26.4 Ohms, as indicated, at the center frequency and is reactive at 21±8j at the desired peak transmission frequencies.

Figure 16:
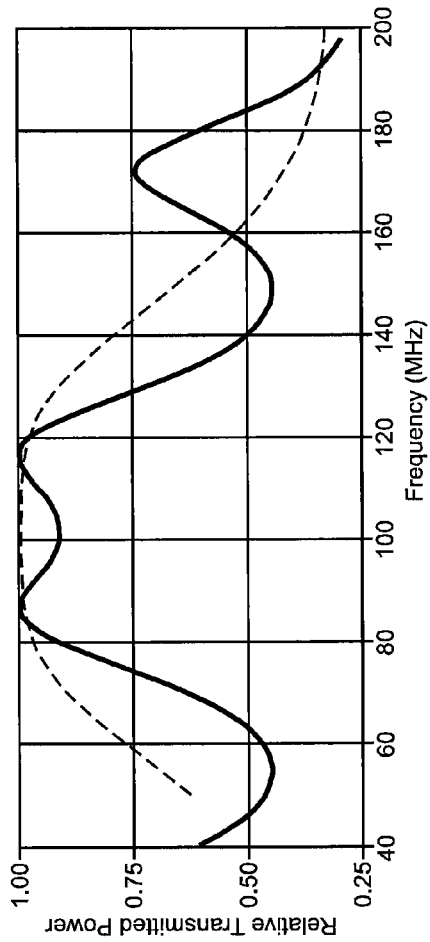
FIG. 16 is graph schematically illustrating calculated relative power transmission as a function of frequency for one example of the transmission-line section arrangement of FIG. 15.

FIG. 16 is a graph schematically illustrating calculated relative transmission for the arrangement of FIG. 15 (bold solid curve), with impedance values and line-lengths as noted above, assuming a center frequency of 100 MHz. The spectral response of the above described example of FIG. 3 is depicted by a fine dashed curve. It can be seen that at the particular peak-transmission frequencies the actual transmission of arrangement 90 is slightly greater than for the "broad-band" example of FIG. 3.

Figure 17:
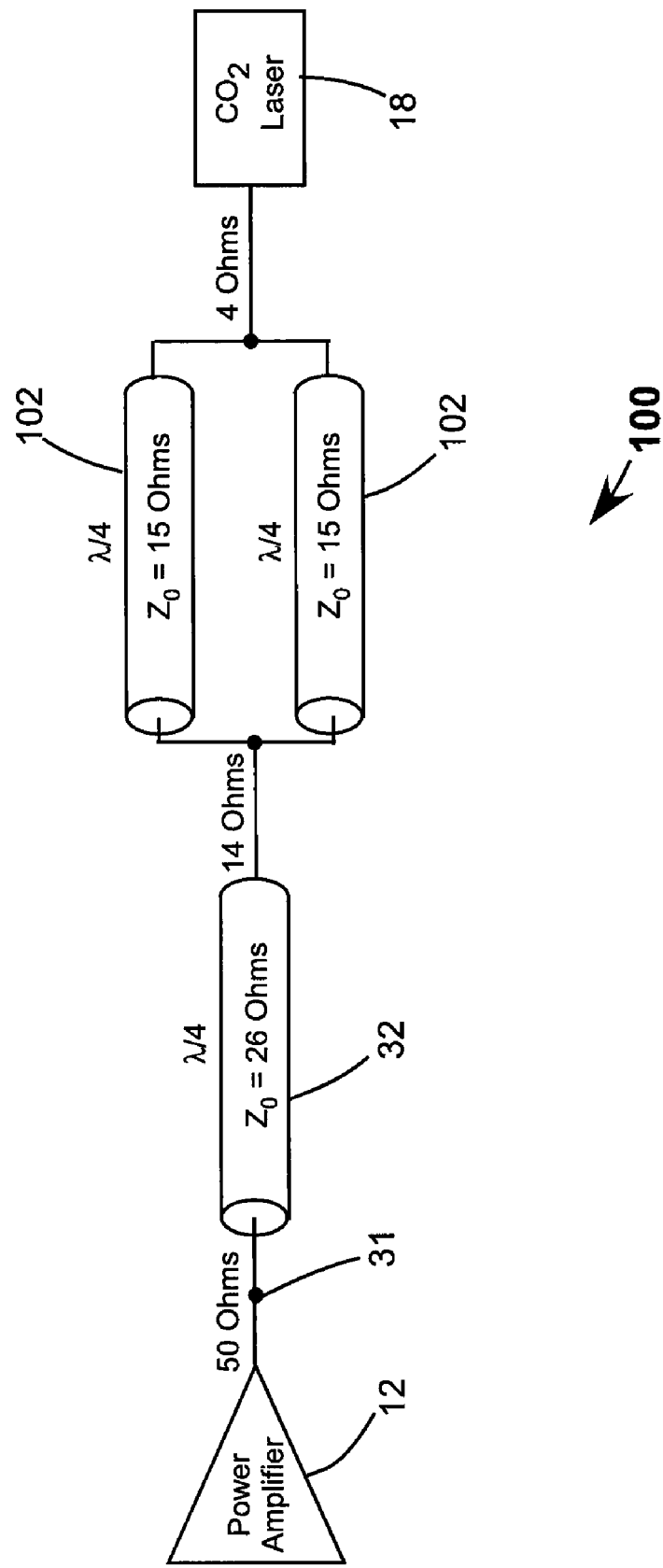
FIG. 17 is a graph schematically illustrates yet another further preferred embodiment of apparatus in accordance with the present invention for delivering power from an RF amplifier to a $CO_2$ laser similar to the arrangement of FIG. 3, but wherein one of the quarter-wavelength-long transmission line sections is replaced by a parallel pair of quarter wavelength long transmission-line sections.

FIG. 17 schematically illustrates yet another further embodiment 100 of an RF power delivery arrangement in accordance with the present invention. Arrangement 100 is similar to arrangement 30 of FIG. 3 with an exception that 7.5-Ohm quarter-wave transmission line section 34 of arrangement 30 is replaced in arrangement 100 by a parallel pair of transmission line sections 102 each thereof having a length of one-quarter wavelength at the nominal center frequency and having an impedance of 15 Ohms to provide the 7.5 Ohms result from the parallel pair.

Those skilled in the art to which the present invention pertains will recognize that in any of the above described embodiments a single transmission line section may be replaced with two or more parallel sections, each thereof having the length of the section being replaced. The sections preferably have the same characteristic impedance, but can have different impedances. This provides a means, albeit with some complication, of providing the equivalent of a line-section having a desired characteristic impedance from line-sections having impedances commercially available from manufacturers' stock. Those skilled in the art will also recognize that while the arrangements of FIG. 9, FIG. 11, FIG. 13, and FIG. 15 are described in a context of delivering power to a $CO_2$ laser from only one amplifier, these arrangements may be included in power combining arrangements including a plurality of RF amplifiers of the type exemplified in FIG. 4 and FIG. 8. It is also possible to include in certain of the inventive arrangements an L-C impedance matching network between the last transmission line section in the arrangement and the $CO_2$ laser as exemplified in FIG. 8A. The L-C matching network, however, should have a bandwidth comparable to the bandwidth of the transmission-line arrangement to avoid mitigating the broad-bandwidth advantage of the inventive transmission line arrangements. It is emphasized, however, that the impedance matching (transformation) flexibility of the present invention described above should be sufficient that an L-C network is not required for optimizing power transmission to the laser in most arrangements.

In summary, the present invention is described above in terms of a number of preferred embodiments. The invention is not limited, however, to the embodiments described and depicted. Rather, the invention is limited only by the claims appended hereto.

What is claimed is:

1. Apparatus, comprising:
a gas discharge laser having an operating impedance in an operating condition at an operating resonant frequency when a gas discharge in the laser is lit;
at least one source of radio frequency (RF) power for powering the gas discharge, the RF power source having a source impedance, the source impedance being greater than the operating impedance;
at least one plurality of transmission line sections connected in series in an electrically conductive path between the RF power source and the laser, at least first and second ones of the transmission line sections having respectively first and second different characteristic impedances;
and wherein the length and characteristic impedance of each of the transmission line sections is selected to transform the source impedance to a third impedance lower than the source impedance for optimizing RF power transmission from the RF power source to the gas discharge laser.

2. The apparatus of claim 1, wherein there is only one RF power source and only one plurality of transmission line sections, and wherein the plurality of transmission line sections is connected directly to the gas discharge laser and the third impedance is about equal to the operating impedance of the gas discharge laser.

3. The apparatus of claim 1, further including an L-C impedance matching network having an input impedance on an input side thereof and an output impedance at an output side thereof, and wherein there is only one RF power source and only one plurality of transmission line sections, the plurality of transmission line sections is connected to the input side of the L-C matching network, the gas laser is connected to the output side of the L-C matching network, the third impedance is about equal to the input impedance and of the L-C matching network, and the output impedance of the L-C matching network is about equal to the operating impedance of the gas discharge laser.

4. The apparatus of claim 1, wherein there are N RF power sources and a corresponding N pluralities of transmission line sections.

5. The apparatus of claim 4, wherein the pluralities of transmission line sections are connected in parallel directly to the laser and the third impedance is about N-times the operating impedance of the laser such that the parallel combination of third impedances is about equal to the operating impedance of the laser.

6. The apparatus of claim 1, wherein the laser has a non-operating resonant frequency in a condition where the gas discharge is not lit, the non-operating resonant frequency being lower than the operating resonant frequency, and wherein the lengths and characteristic impedance of the transmission line sections are selected such that RF power to the laser is optimized over a frequency range including the non-operating resonant frequency and the operating resonant frequency.

7. The apparatus of claim 6, wherein there are only the first and second transmission line sections in the plurality thereof, and wherein each of the transmission line sections is electrically about one-quarter wavelength long at a wavelength corresponding to a frequency between the operating resonant frequency of the laser and the non-operating resonant frequency of the laser.

8. The apparatus of claim 6, wherein there are first, second, and third transmission line sections in the plurality thereof, and wherein each of the transmission line sections is electrically about one-sixth wavelength long at a wavelength corresponding to a frequency about equal to or less than the operating frequency of the laser.

9. The apparatus of claim 6, wherein there are first, second, and third transmission line sections in the plurality thereof, and wherein the transmission line sections have a combined electrical length of about three-eighths of a wavelength at a wavelength corresponding to a frequency between the operating resonant frequency of the laser and the non-operating resonant frequency of the laser.

10. The apparatus of claim 9, wherein the second transmission line section has an impedance higher than the source impedance.

11. The apparatus of claim 9, wherein there are first, second, third, and fourth transmission line sections in the plurality thereof, and wherein each of the transmission line sections is electrically about one-eighth wavelength long at a wavelength corresponding to a frequency about equal to or less than the operating frequency of the laser.

12. The apparatus of claim 1, wherein the laser has a non-operating resonant frequency in a condition where the gas discharge is not lit, the non-operating resonant frequency being lower than the operating resonant frequency, and wherein the lengths and characteristic impedance of the transmission line sections are selected such that RF power to the laser is maximized at both the non-operating resonant frequency and the operating resonant frequency.

13. The apparatus of claim 12, wherein there are only first and second transmission line sections in the plurality thereof, the first and second transmission line sections having electrical lengths of about three-quarters of a wavelength and one-quarter of a wavelength, respectively, at a wavelength corresponding to a frequency between the operating resonant frequency of the laser and the non-operating resonant frequency of the laser.

14. The apparatus of claim 13, wherein the first impedance is lower than the source impedance and higher than the second impedance and the second impedance is higher than the operating impedance of the laser.

15. The apparatus of claim 1, wherein any of the transmission line sections in the plurality thereof is connected in a parallel combination with at least one other transmission line section to provide the effect of a single transmission line section having an impedance intermediate the impedances of the transmission line sections in the combination.

* * * * *